(12) United States Patent
Allison

(10) Patent No.: US 11,032,310 B2
(45) Date of Patent: *Jun. 8, 2021

(54) SECURED SYSTEM FOR TESTING AND MAINTENANCE OF BULK ELECTRICAL SYSTEMS (BES) ASSETS

(71) Applicant: Doble Engineering Company, Marlborough, MA (US)

(72) Inventor: Jason Alexander Allison, Lancaster, MA (US)

(73) Assignee: Doble Engineering Company, Watertown, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/846,109

(22) Filed: Apr. 10, 2020

(65) Prior Publication Data

US 2020/0244697 A1 Jul. 30, 2020

Related U.S. Application Data

(63) Continuation of application No. 15/473,037, filed on Mar. 29, 2017, now Pat. No. 10,623,437.

(Continued)

(51) Int. Cl.
*G06F 11/00* (2006.01)
*H04L 29/06* (2006.01)
(Continued)

(52) U.S. Cl.
CPC .... *H04L 63/1433* (2013.01); *G01R 31/31719* (2013.01); *G06F 21/577* (2013.01);
(Continued)

(58) Field of Classification Search
CPC . H04L 63/1441; H04L 63/1433; H04L 43/50; H04W 12/08; G06F 21/6218; G06F 21/577; G01R 31/31719
(Continued)

(56) References Cited

U.S. PATENT DOCUMENTS 7,478,420 B2   1/2009  Wright et al.
7,891,004 B1 * 2/2011  Gelvin ............... G06F 15/173
                                                   726/26

(Continued)

FOREIGN PATENT DOCUMENTS

EP      1 653 664 A1    5/2006

OTHER PUBLICATIONS

Doble Accessories, DUC™, Doble Universal Controller™, dated Jul. 2015, pp. 1-2, MKT_SL_DUC_C6_07/15.

(Continued)

*Primary Examiner* — Amare F Tabor
(74) *Attorney, Agent, or Firm* — Brinks Gilson & Lione

(57) ABSTRACT

A method for protecting a mobile terminal device from cyber security threats, including the steps of: detecting that the mobile terminal device is successfully connected only through one or both of a selected physical serial interface connected to a device for facilitating the testing or a wired network interface, which is connected to an electrical utility device. Prior to executing a test routine by the mobile terminal device, switching the mobile terminal device to a test state by: disabling an internal firewall, disabling one or more remaining network interfaces and serial interfaces, such that existing communications or connections are terminated and new communications and connections are prevented. Enabling communication to one or both of the selected physical serial interface and the wired network interface, performing the testing on the at least one electrical utility device according to the executed test routines under control of the mobile terminal device until completion.

20 Claims, 5 Drawing Sheets

Related U.S. Application Data

(60) Provisional application No. 62/317,058, filed on Apr. 1, 2016.

(51) Int. Cl.
  *G06F 21/57* (2013.01)
  *G01R 31/317* (2006.01)
  *H04W 12/08* (2021.01)
  *H04W 12/088* (2021.01)

(52) U.S. Cl.
  CPC ......... *H04L 63/1441* (2013.01); *H04W 12/08* (2013.01); *H04W 12/088* (2021.01)

(58) Field of Classification Search
  USPC .......................................................... 726/22
  See application file for complete search history.

(56) References Cited

U.S. PATENT DOCUMENTS

| | | | | |
|---|---|---|---|---|
| 8,155,121 | B2 * | 4/2012 | Gudan | G06F 21/6218 370/392 |
| 8,532,271 | B2 | 9/2013 | Lin | |
| 8,751,827 | B1 * | 6/2014 | Duane | G06F 21/32 713/193 |
| 8,850,513 | B2 | 9/2014 | Park et al. | |
| 2002/0162059 | A1 | 10/2002 | McNeely et al. | |
| 2003/0177389 | A1 | 9/2003 | Albert et al. | |
| 2009/0112964 | A1 | 4/2009 | McGlone et al. | |
| 2011/0021188 | A1 | 1/2011 | Tanaka | |
| 2011/0039237 | A1 | 2/2011 | Skare | |
| 2011/0055438 | A1 | 3/2011 | Nakagawa | |
| 2012/0060039 | A1 * | 3/2012 | Leclercq | H04L 9/3265 713/189 |
| 2012/0131157 | A1 | 5/2012 | Gospodarek et al. | |
| 2014/0259095 | A1 | 9/2014 | Bryant | |
| 2014/0283047 | A1 | 9/2014 | Dixit et al. | |
| 2015/0268291 | A1 | 9/2015 | Lachman | |
| 2016/0078223 | A1 * | 3/2016 | Buer | G06F 21/602 713/189 |
| 2016/0095150 | A1 | 3/2016 | Howe-Rybert et al. | |
| 2016/0112445 | A1 | 4/2016 | Abramowitz | |
| 2018/0026999 | A1 | 1/2018 | Ruvio et al. | |

OTHER PUBLICATIONS

Doble Accessories, miniDUC™, Mini Doble Universal Controller™, dated Nov. 2015, pp. 1-2, MKT_SL_miniDUC_11/15.

International Search Report and Written Opinion on Patentability, dated Jun. 16, 2017, pp. 1-14, ISA/US; PCT/US2017/024971 filed Mar. 30, 2017; U.S. Patent and Trademark Office, Alexandria, VA.

Extended European Search Report, dated Oct. 24, 2019, pp. 1-5, issued in European Patent Application No. 17776634.2, European Patent Office, Munich, Germany.

* cited by examiner

SECURED SYSTEM FOR TESTING AND MAINTENANCE OF BULK ELECTRICAL SYSTEMS (BES) ASSETS

RELATED APPLICATIONS

This application is a continuation of U.S. patent application Ser. No. 15/473,037 filed Mar. 29, 2017, which claims priority to U.S. Provisional Application No. 62/317,058, filed Apr. 1, 2016, both of which are incorporated by reference in their entirety.

FIELD OF THE TECHNOLOGY

The present application relates to cyber security protection to a mobile terminal which is configured to perform testing and maintenance of a Bulk Electrical Systems (BES) asset in a substation.

BACKGROUND

Bulk Electrical Systems (BES) assets (i.e., a power transformer, a current transformer, a circuit breaker, a recloser, a relay, a transformer bushing, a coupling capacitor and a surge arrester etc.) in the electrical utilities industry face significant adversity with cyber security threats and attacks during testing and maintenance test routines run by a mobile terminal which is connected to a network. This adversity creates challenges for the electrical utilities industry which strives to implement secure but reasonable technology policies and practices for field technicians, who manage and test electrical subsystems assets with a mobile terminal which is a microprocessor-based device having one or more communication interfaces.

For example, any mobile terminal which is installed with an electrical utility test software configured for testing a BES asset (or any electrical device) may be exposed to risks of cyber-attacks, thus may be unable to meet the cyber security requirements as defined by the North American Electric Reliability Corporations Critical Infrastructure Protection (NERC CIP) standards in the electrical utilities substations.

SUMMARY

Disclosed below are a method, a mobile terminal device and a non-transitory computer-readable storage medium for protecting a mobile terminal from risks of cyber-attacks for performing testing on a Bulk Electrical Systems (BES) asset (or any electrical device).

A first embodiment is directed to a method for protecting a mobile terminal device from cyber security threats when performing testing on an electrical utility device. The method includes configuring the mobile terminal device to perform the steps of: executing by at least a processor in the mobile terminal device, test routines instruction code stored in a non-transitory memory to configure the mobile terminal device to perform testing on at least one electrical utility device, wherein the mobile terminal device is configured to: detect that the mobile terminal device is successfully connected only through one or both of a selected physical serial interface and a wired network interface, wherein the selected physical serial interface is connected to a device for facilitating the testing or to another electrical utility device under test and the wired interface is connected to the at least one electrical utility device. Prior to executing a test routine by the mobile terminal device, switching the mobile terminal device to a test state by performing within the mobile terminal device in any sequence, the following: disabling an internal firewall of the mobile terminal device, disabling communication to one or more remaining network interfaces, and disabling connection to one or more remaining unselected physical serial interface for plug-in device port, such that existing communications or connections are terminated and new communications and connections are prevented. The method also includes enabling communication to only one or both of the selected physical serial interface and the wired network interface; and performing the testing on the at least one electrical utility device according to the executed test routines under control of the mobile terminal device until completion.

The method may further include: upon detecting the completion of the testing on the at least one electrical utility device, switching the mobile terminal device to a network state by performing within the mobile terminal device in any sequence, the following: disabling communication to the one or both of the selected physical serial interface and the wired network interface; enabling the internal firewall of the mobile terminal device, such that new communications or connections are permitted; selecting at least one network interface from among the disabled one or more remaining network interfaces to enable new communications, while keeping unselected one or more remaining network interface and the one or more remaining unselected physical serial interface for plug-in device port disabled; and changing a state mode on a display on the mobile terminal device from the test state to a network state while continue disabling communication to the one or both of the selected physical serial interface and the wired network interface, unless successful connection of one or both of the selected physical serial interface or the wired network interface between the mobile terminal device to the one or both of the device for facilitating the testing or to another electrical utility device under test and the at least one electrical utility device has been detected, wherein the test state mode on the mobile terminal device is being restored.

A second embodiment is directed to a mobile terminal device that is configured to be protected from cyber security threats when connected to an electrical utility device under test. The mobile terminal device may include a processor. The processor executes test routines instruction code stored in a non-transitory memory. When the processor executes the instruction code, the processor configures the mobile terminal device to perform testing on at least one electrical utility device. In particular, the mobile terminal device is configured to detect that the mobile terminal device is successfully connected only through one or both of a selected physical serial interface and a wired network interface, wherein the selected physical serial interface is connected to a device for facilitating the testing or to another electrical utility device under test and the wired interface is connected to the at least one electrical utility device. Prior to executing a test routine by the mobile terminal device, switch the mobile terminal device to a test state by performing in any sequence, the following: disable an internal firewall of the mobile terminal device, disable communication to one or more remaining network interfaces, and disable connection to one or more remaining unselected physical serial interface for plug-in device port, such that existing communications or connections are terminated and new communications and connections are prevented; enable communication to only one or both of the selected physical serial interface and the wired network interface; and perform the testing on the at least one electrical utility device according to the executed test routines under control of the mobile terminal device until completion.

A third embodiment is directed to a non-transitory computer-readable storage medium for protecting a mobile terminal device from cyber security threats having stored thereon, a computer program having at least one test routine code section when being executable by at least a processor in the mobile terminal device, configuring the mobile terminal device to: detect that the mobile terminal device is successfully connected only through one or both of a selected physical serial interface and a wired network interface, wherein the selected physical serial interface is connected to a device for facilitating the testing or to another electrical utility device under test and the wired interface is connected to the at least one electrical utility device. Prior to executing a test routine by the mobile terminal device, switching the mobile terminal device to a test state by performing within the mobile terminal device in any sequence, the following: disabling an internal firewall of the mobile terminal device, disabling communication to one or more remaining network interfaces, and disabling connection to one or more remaining unselected physical serial interface for plug-in device port, such that existing communications or connections are terminated and new communications and connections are prevented. The method also includes enabling communication to only one or both of the selected physical serial interface and the wired network interface; and performing the testing on the at least one electrical utility device according to the executed test routines under control of the mobile terminal device until completion.

Executing the program codes stored in the non-transitory computer-readable storage medium in the mobile terminal device may protect the mobile terminal from cyber security threats through opened cyber space during testing. A person of ordinary skill in the art would recognize that other electrical devices not classified within the utility power device category may also be protected from cyber-attacks when connected to the mobile terminal device using the described method and system for testing. The steps disclosed in the method may be carried out in modified sequences to suit the electrical device test routine.

BRIEF DESCRIPTION OF THE DRAWINGS

The accompanying drawings are included to provide a further understanding of the claims, are incorporated in, and constitute as part of this specification. The detailed description and illustrated embodiments described serve to explain the principles defined by the claims.

DETAILED DESCRIPTION OF THE EMBODIMENTS

The various embodiments of the present disclosure are further described in details in combination with attached drawings and embodiments below. It should be understood that the specific embodiments described herein are used only to explain the present disclosure, and should not be construed as a limitation on the claims. Similar features may be referenced back to the prior descriptions in a prior numbered drawing or referenced ahead to a higher numbered drawing.

Exemplary testing methods and exemplary devices used to facilitate the testing of the BES asset (140) in this disclosure may be provided in details by referring to Doble Engineering's U.S. application Ser. No. 15/457,491 titled "METHOD AND SYSTEM OF APPARATUSES FOR TESTING UTILITY POWER DEVICES" filed on Mar. 13, 2017, to U.S. application Ser. No. 15/279,032 titled "METHOD AND APPARATUS FOR TESTING UTILITY POWER DEVICES" filed on Sep. 28, 2016, and to U.S. Pat. No. 9,482,712 issued on Nov. 1, 2016. The content of which are incorporated herewith by reference.

Figure 1:
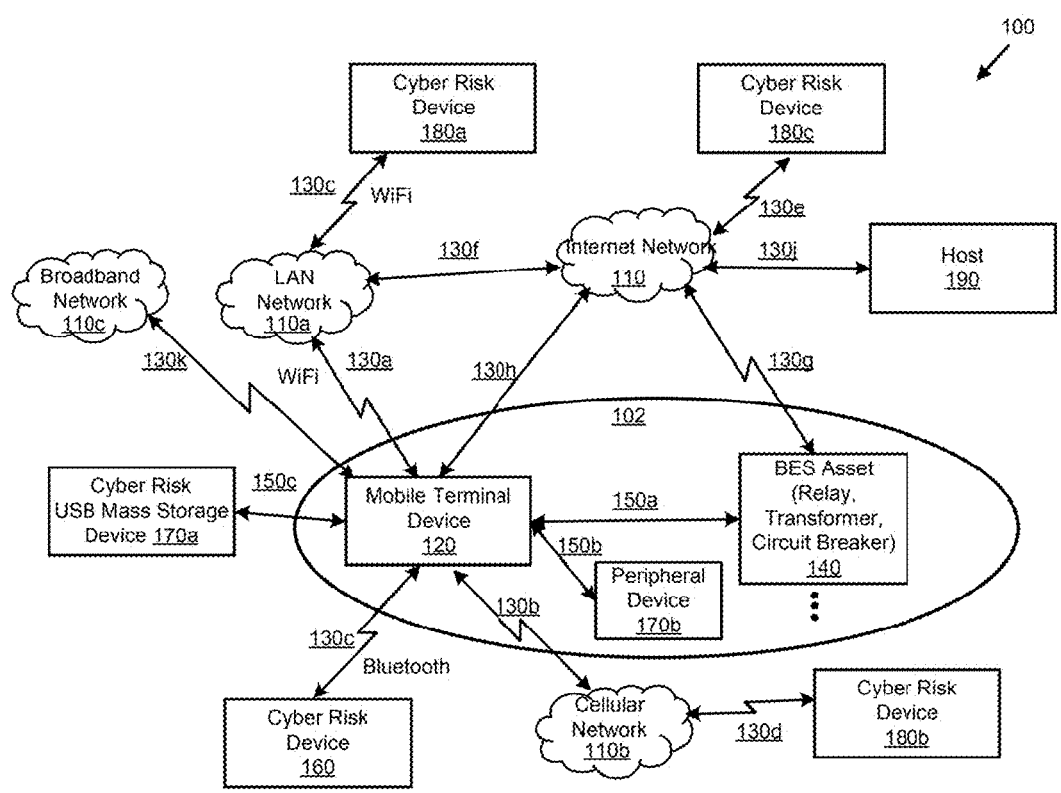
FIG. 1 illustrates an exemplary system block diagram illustrating a mobile terminal device performing a test or maintenance task on a BES asset (electrical utility device) in presence of a network environment, according to an embodiment.
Figure 4:
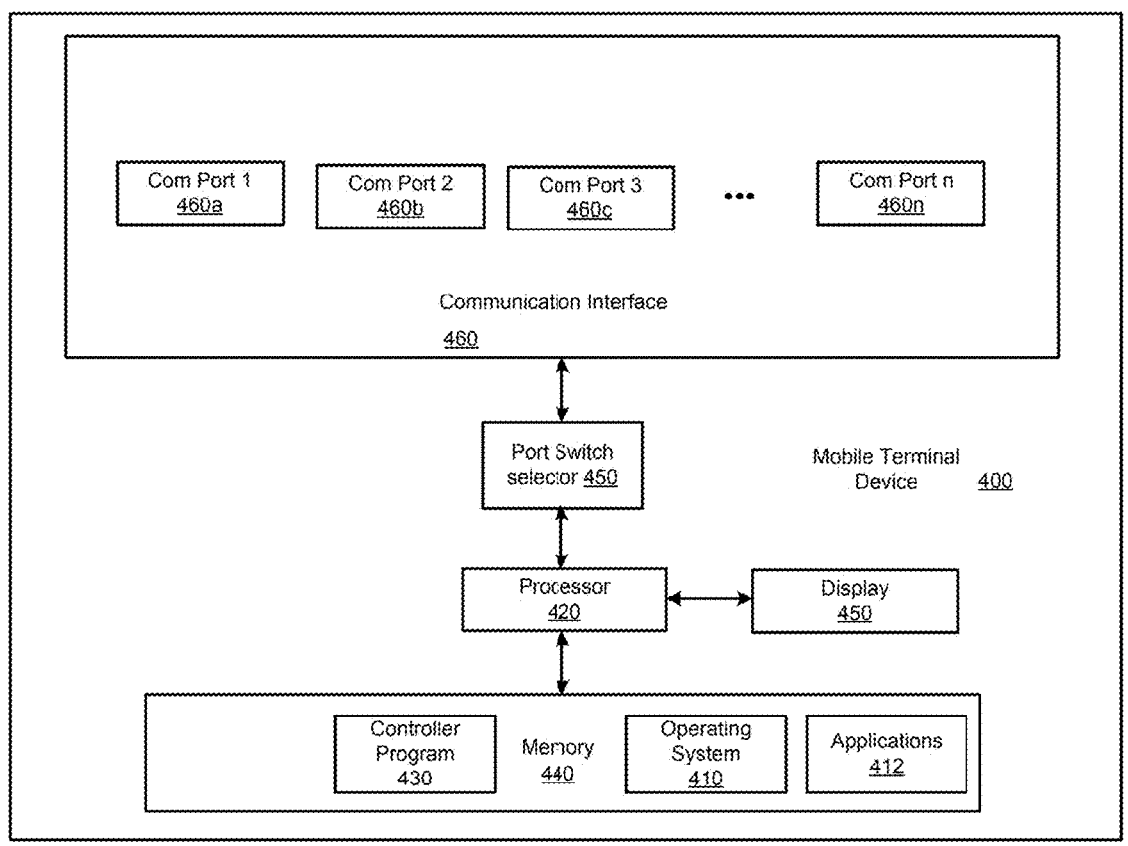
FIG. 4 illustrates an exemplary mobile terminal device for performing a test or maintenance task on a BES asset, according to an embodiment.

FIG. 1 illustrates an exemplary system block diagram (102) illustrating a mobile terminal device (120) performing a test or maintenance task on at least one BES asset (140) (i.e., electrical utility device) in presence of a network environment (100), according to an embodiment. FIG. 4 illustrates an exemplary mobile terminal device for performing a test or maintenance task on the at least one BES asset (140), according to an embodiment. It should be pointed out that more than one BES asset (140) may be simultaneously controlled and tested by the same mobile terminal device (120) through connecting multiple wired network interfaces or in combination with connecting through a selected physical serial interface.

To help understanding of the described method and operations of the mobile terminal device (120 or 400), FIGS. 1 and 4 will both be referred in the following description. Referring to FIG. 4, the mobile terminal device (400) (see FIG. 4) may be a standard portable computing device including at least a CPU processor (420), a memory (440), and a network interface card (460) (see FIG. 4) capable of connecting to one or more respective networks (Internet (110), LAN (110a), Broadband (110c), Cellular (110b), Bluetooth®) LAN through wired connection (130h) or wireless connections (130a, 130b, 130c), through respective COM ports (460a to 460n). The memory (440) may store an operating system (OS) (410), a plurality of applications (412) and an electrical utility test software (controller program (430)) (see FIG. 4).

Test routines to various BES assets may be written as executable program codes in a controller program (430), which may be stored on a non-transitory computer-readable storage medium in a mobile terminal device's local memory (440) (such as a ROM, a flash memory, local solid state hard drive) or may be downloaded from a network, from an external USB class mass storage device (170a) (such as a USB flash memory, an optical readable Compact Disc Rom (CD ROM), an external hard disk, or from an external solid state hard drive using a USB interface, to name a few). The executable program codes in the controller program (430)) when executed by the processor (420), may configure the mobile terminal device (400) to carry out the operations under an instrumented finite-state machine (see FIGS. 2A-2b, 3A-3B) in either a "Test state" mode or in a "Network state" mode when perform testing on a BES asset (140).

The mobile terminal device (400) may include one or more communication ports (see FIG. 4, COM Port 1 (460a) . . . COM Port n (460n)) for carrying out one or both of wired and wireless network interface connections, and serial interface connections with USB class plugged-in devices. For example, the COM Port 1 (460a) on the mobile terminal device (400) may be a wired network interface (150a) and COM Port 2 (460b) may be connected to a physical serial interface (150b). The wired interface (150a) of COM Port 1 (460a) may be an Ethernet interface and any suitable physical serial interface connection that communicates bidirectional signals in high data rate under a standard communication protocol. The physical serial interface may be a Universal Serial Bus (USB) interface or any suitable serial interface.

The mobile terminal device (120) may be a regular computer, a laptop computer, a tablet computer, or a dedicated proprietary testing hardware (such as a Doble Universal Controller DUC™), having a plurality of communication ports as described in FIG. 4, which runs software programs specifically configured to perform electrical utility tests and maintenance on the BES asset. The BES asset (140) itself however, may have its own wireless interface (130) to communicate with a host (190) through the Internet network (110).

Referring to FIG. 1, when running a test on at least one BES asset (140), the mobile terminal device (120) may simultaneously be connected to one or both of a wired network interface (150a) and a selected physical serial interface (150b), wherein the wired interface (150a) is connected to the BES asset (140) and the selected physical serial interface (150b) is connected to a device (170b) for facilitating the testing or to another electrical utility device under test. The device (170b) for facilitating the testing may be one or more of: a peripheral device, a voltage source and a switch matrix, and the another electrical utility device may be just another BES asset (140).

The mobile terminal device (120) may connect to a network environment (100) through one or more remaining communication ports COM Port 3 (460c) to COM Port n (460n). The remaining communication ports COM Port 3 (460c) to COM Port n (460n) may be connected to respective network interfaces or to respective USB class plug-in device ports. The respective network interfaces may form network connections with anyone or more of: an Internet network (110) through wired connections (130f, 130h and 130j) and wireless connections (130e, 130g); a Local Area Network (LAN) (110a) through Wireless Fidelity (WiFi) connections (130a, 130c); a broadband network connection (130k), a cellular network (110b) through 4G/LTE packet data radio connections (130b, 130d), and Bluetooth® connections (130c).

When the mobile terminal device (120) is connected to the network environment (100) while simultaneously performing the testing and maintenance on the BES asset (140), the mobile terminal device (120) may become a target of cyber-attacks by anyone of the remote cyber risk devices (180a, 180b, 180c, 160) through one or more respective network connections (130a, 130b, 130c, 130h) which may spread computer viruses. Computer viruses may also be introduced through plugging in an infected external plug-in device such as a USB class Mass storage device (170a)) to another physical serial interface connection (150c) of the mobile terminal device (120).

Computer viruses, also known as malware may exist in various types. One well-known type may be a Trojan horse virus, which may contain files capable of replicating themselves and modifying an infected mobile terminal device's programs. In a scenario, the computer virus may taking over control of the infected mobile terminal device (120) by sending commands through the one or both of the selected physical serial interface (150b) or wired interface (150a) to infect the BES asset (140) under test by programming the BES asset (140) to be turned off when receiving a certain command, or damaging the device (170b) facilitating testing, thus may cause disruptions or instability to the electric power grid.

It is therefore preferable to prior to testing the BES asset (140), isolate the remaining communication ports and from unselected physical serial interface connections (150c) to COM Port 3 (460c) to COM Port n (460n) of the mobile terminal device (120) from external network connections (110, 110a, 110b) as a precaution to protect the mobile terminal device (120) from potential cyber-attacks, thus meeting the cyber security requirements as defined by the North American Electric Reliability Corporations Critical Infrastructure Protection (NERC CIP) standards in the electrical utilities substations.

Figure 2A:
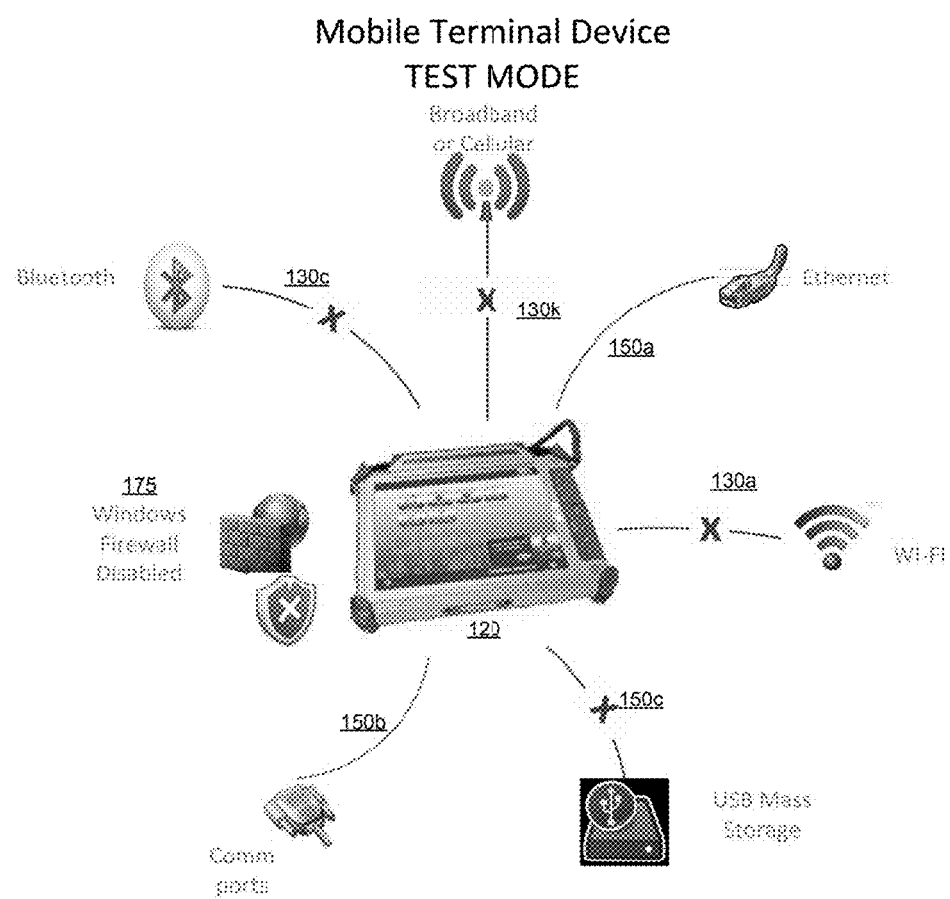
FIG. 2A illustrates the mobile terminal device switching to a "Test State" mode prior to performing testing or maintenance task on a BES asset, according to an embodiment.

FIG. 2A illustrates the mobile terminal device switching to a "Test State" mode prior to performing testing or maintenance task on a BES asset, according to an embodiment. After detecting that the mobile terminal device (120) is successfully connected only through one or both of a selected physical serial interface (150b) and a wired network interface (150a) (e.g., selecting COM Port 2 to connect to the peripheral serial interface (150b) with the device (170b) and selecting and COM Port 1 to connect to the wired network interface (150a) with the BES asset (140)), and prior to executing a test routine by the mobile terminal device (120), the mobile terminal device (120) is switched to a "Test State" mode by performing all of the following steps: disabling an internal firewall (175) of the mobile terminal device, disabling one or more remaining network interfaces (130a, 130b, 130c), and disabling one or more unselected physical serial interface for plug-in device port (150c) such that existing communications or connections are terminated and new communications and connections are prevented. For example, COM Ports 3 to COM Ports n (see FIG. 4) may be disabled.

Afterwards, enabling communication to only one or both of the selected physical serial interface (150b) and the wired network interface (150a) between the mobile terminal device (120) and the device (170b) and the BES asset (140) only through the selected physical interface or the wired network interface (150a) at COM Port 1 (460a); and performing the testing on the BES asset (140) according to the executed test routines (i.e., controller program (430) under control of the mobile terminal device (120) until completion.

The BES asset (140) may be an electrical utility device which may be anyone of: a power transformer, a current transformer, a circuit breaker, a recloser, a relay, a transformer bushing, a coupling capacitor and a surge arrester.

In an embodiment, the physical interface or wired interface (150a) may be an Ethernet interface and any suitable physical interface connection that communicates bidirectional signals in high data rate under a communication protocol.

In an embodiment, the existing connections or the new connections to the one or more remaining network interfaces (COM Port 3 to COM Port n) may be connections to anyone of: a local area network (LAN) (110a), a wide area network (WAN) or an Internet (110), a Broadband network (110c), a Cellular network (130b), a Wireless Fidelity (WiFi) network (130a), and a Bluetooth® Network (130c) or to the unselected physical serial interface connection (150c) to a plug-in device such as a Universal Serial Bus (USB) Mass Storage device (170a).

In an embodiment, the method may include determining of device names, port names, and network names prior to the disabling of one or more remaining network interfaces or one or more unselected physical serial interface for plug-in device such that existing communications or connections are terminated and new communications and connections are prevented. The determination of device names, port names or network names may be according to anyone of: net class devices containing "Ethernet" in name, ports class devices containing "COM" in name, Bluetooth® net class devices containing "Wireless" in name, USB class devices containing "Broadband" in name, USB class devices containing "USB Mass Storage Device" in name, and device Firewall (175) with profile rules to grant or deny Public and Private network connection to allow or prohibit data transfer to and from the mobile terminal device (120).

To summarize, while in the "Test state" mode, the mobile terminal device (120) will disable the device Firewall (175) to deny permission to internal and external remote connectivity for a purpose of eliminating remote attacks and limiting exposure in the event of a compromised system through a data driven, dynamically configured, least permission model. While in the "Test state" mode the electrical utility field technician may therefore securely perform their duties on the BES assets (140) which are high value substation assets. The mobile terminal device (120) may visually display an indication that it is in the "Test state" mode for a purpose of quickly informing the user of the current state the mobile terminal device is in.

Figure 2B:
FIG. 2B illustrates the mobile terminal device switching to a "Network State" mode after performing testing or maintenance task on a BES asset, according to an embodiment.

FIG. 2B illustrates the mobile terminal device switching to a "Network State" mode after performing testing or maintenance task on a BES asset, according to an embodiment. Upon detecting the completion of the test routines on the BES asset (140), the mobile terminal device (120) may be switched to a "network state" mode by performing the following steps: disabling communication to the one or both of the selected physical serial interface (150b) and the wired network interface (150a) such that there is no more communication between the mobile terminal device (120) and the one or both of the BES asset (140) and the device (170b) (device for facilitating the testing or to another electrical utility device under test). Of course, if one chooses to, the communication between the mobile terminal device (120) and the one or both of the BES asset (140) and the device (170b) may be maintained. Enabling the internal firewall (175) of the mobile terminal device (120), such that new communications or connections are permitted for selecting at least one network interface (130a, 130b) from among the disabled one or more remaining network interfaces (130a, 130b, 130c) to enable new communications, while keeping unselected one or more remaining network interface (130c) and the one or more remaining unselected physical serial interface (150c) for plug-in device port disabled. Changing a state mode on a display (450) on the mobile terminal device (120) from the "Test state" to a "Network state" while continue disabling communication (150a) to the one or both of the selected physical serial interface (150b) and the wired network interface (150a), unless successful connection of one or both of the selected physical serial interface (150b) or the wired network interface (150a) between the mobile terminal device (120) to the one or both of the device (170b) for facilitating the testing or to another electrical utility device under test and the at least one BES (140) has been detected, wherein the "Test state" mode on the mobile terminal device (120) is being restored.

When transitioning out of the "Test state" mode to the "Network state" mode, the user of the mobile terminal device (120) is prompted. While in the "Network state" mode, the Firewall (175) of the mobile terminal device (120) is enabled to secure permission for internal and external remote network connectivity, and the electrical utility field technician is precluded from performing their testing duties on the BES asset (140). This exclusion enhances an emphasis on a defense in depth, least permission model for the purpose of mitigating cyber security threats and attacks. While in the "Network state" mode, the mobile terminal device may visually display that it is in the "Network state" mode.

Figure 3A:
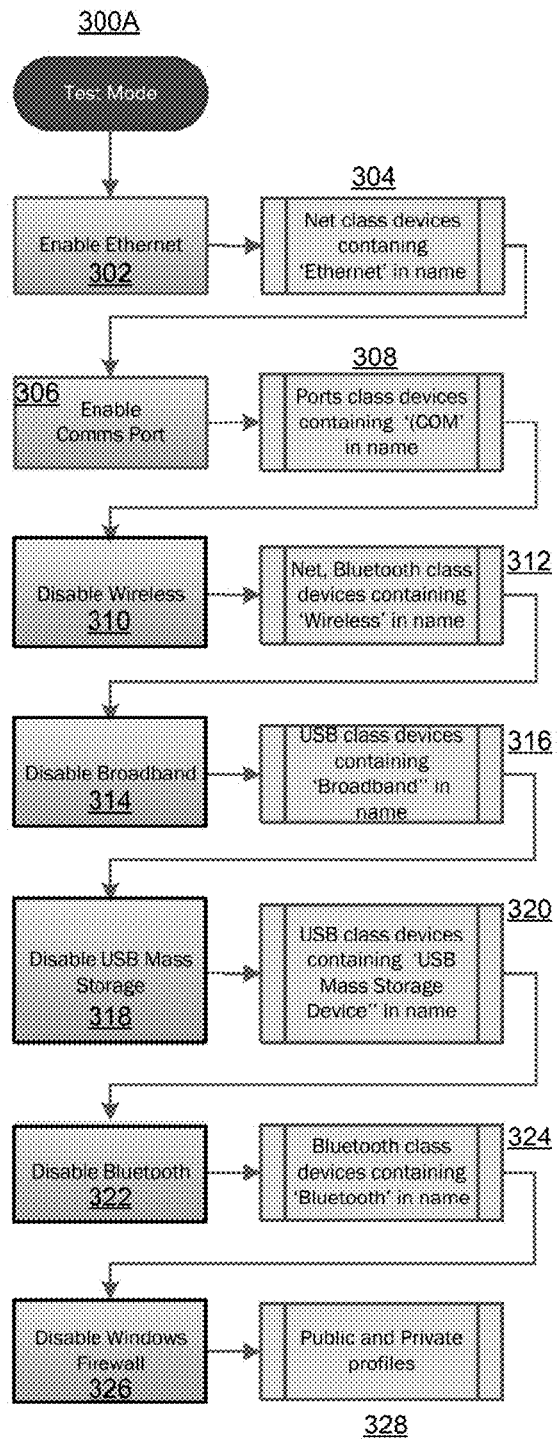
FIG. 3A illustrates the exemplary steps carried out in the mobile terminal device when switching to a "Test State" mode prior to performing testing or maintenance task on a BES asset, according to an embodiment.

FIG. 3A illustrates the exemplary steps carried out in the mobile terminal device when switching to a "Test State" mode prior to performing testing or maintenance task on a BES asset, according to an embodiment. The steps in FIG. 3A may be carried out in any sequence without affecting the overall outcome of the "Test State" mode.

After the mobile terminal device (120) entered into the "Test State" mode, a wired network interface (150a) such as an Ethernet network interface may be enabled in step 302, and one or more Net class devices containing "Ethernet" in name may be read and registered with a permission to connect to a network or to another device such as the BES asset (140) in FIG. 1 in step 304.

A communication port for a selected physical serial interface (150b) may be enabled in step 306, and one or more Port class devices containing "COM" in name may be read and registered with permission to connect to another device (170b) such as a peripheral device in step 308 for facilitating the testing or to another electrical utility device under test.

One or more Bluetooth®wireless network ports (such as Bluetooth® Port (130c) in FIG. 2A) may be disabled in step 310, and one or more Net Bluetooth® class devices containing "Wireless" in name may be read and registered with no permission to connect to a Bluetooth® network (130c) in FIG. 1 in step 312.

One or more Broadband wireless network ports (130k) may be disabled in step 314, and one or more USB class devices containing "Broadband" in name may be read and registered with no permission to connect to the Broadband network (110d) in FIG. 1 in step 316.

One or more remaining unselected physical serial interface for plug-in device port such as a USB class plug-in device port (150c) may be disabled in step 318, and one or more USB class devices containing "USB Mass Storage Device" in name may be read and registered with no permission to connect to the USB Mass Storage device (170a) in FIG. 1 in step 320.

One or more Bluetooth® wireless device ports may be disabled in step 322, and one or more Bluetooth® class devices containing "Bluetooth®" in name may be read and registered with no permission to connect to a Bluetooth® device (160) in FIG. 1 in step 324.

A Windows® Firewall (180) may be disabled in step 326, profiles containing rules on granting "Public and Private" network connection may be denied to prohibit transfer of data to and from the mobile terminal device (120) in step 328.

Figure 3B:
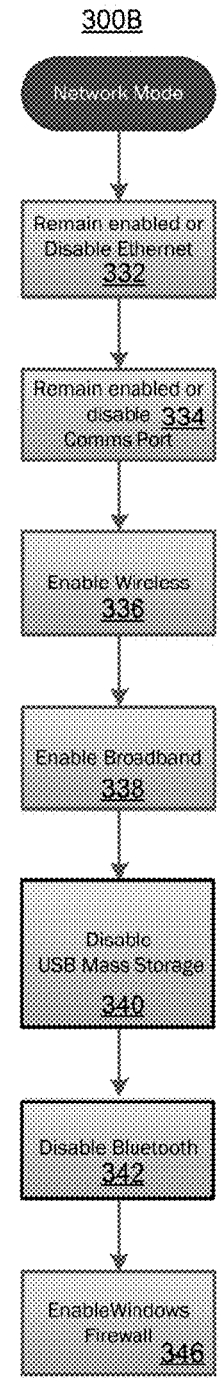
FIG. 3B illustrates the exemplary steps carried out in the mobile terminal device when switching to a "Network State" mode after performing testing or maintenance task on a BES asset, according to an embodiment.

FIG. 3B illustrates the exemplary steps carried out in the mobile terminal device when switching to a "Network State" mode after performing testing or maintenance task on a BES asset, according to an embodiment. The steps in FIG. 3B may be carried out in any sequence without affecting the overall outcome of the "Network State" mode.

After the mobile terminal device (120) entered into the "Network State" mode, the wired network interface (150a) such as the Ethernet network interface may be disabled in step 332, such that the one or more Net class devices containing "Ethernet" in name may be denied permission to connect to the network or to the BES asset (140) in FIG. 1. In another embodiment, the wired network interface (150a) such as the Ethernet network interface may remain enabled in step 332, such that the one or more Net class devices containing "Ethernet" in name may continue to receive permission to connect to the network or to the BES asset (140) in FIG. 1.

The selected physical serial interface (150b) connected to the device (170b) communication ports (such as COM Port 2 (460b) in FIG. 4) may be disabled in step 334, and the Port class devices containing "COM" in name may be denied permission to connect to the device (170b) such as a peripheral device for facilitating the testing or the another electrical utility device under test device in FIG. 1. In another embodiment, the selected physical serial interface (150b) connected to the device (170b) communication ports (such as COM Port 2 (460b) in FIG. 4) may remain enabled in step 334, and the Port class devices containing "COM" in name may continue to receive permission to connect to the device (170b) such as a peripheral device for facilitating the testing or the another electrical utility device under test device in FIG. 1.

The one or more Bluetooth®wireless network ports (such as Bluetooth® Port (130c) in FIG. 2A) may be enabled in step 336, and the one or more Net Bluetooth® class devices containing "Wireless" in name may receive permission to connect to a Bluetooth® network (130c) in FIG. 1.

The one or more Broadband wireless network ports (130k) may be enabled in step 338, and the one or more USB class devices containing "Broadband" in name may receive permission to connect to the Broadband network (110d) in FIG. 1.

The one or more remaining unselected physical serial interface (150c) for plug-in device port such as the USB class plug-in device port may remain disabled in step 340, and the one or more USB class devices containing "USB Mass Storage Device" in name may not receive permission to connect to the USB Mass Storage device (170a) in FIG. 1.

The one or more Bluetooth® wireless device ports may remain disabled in step 342, and the one or more Bluetooth® class devices containing "Bluetooth®" in name may not receive permission to connect to a Bluetooth® device (160) in FIG. 1.

The Windows® Firewall (180) may be enabled in step 346, such that profiles with rules on "Public and Private" network connection may be granted permission to allow transfer data to and from the mobile terminal device (120).

All or part of the operations described above in the embodiments may be implemented via instruction code/program (430) stored in a non-transitory computer-readable medium such as a memory (440), which may be a ROM/RAM, a magnetic disk, a solid state hard drive, or an optical disk, which may be executed by the processor (420) in a machine, such as in mobile terminal device (120), a computer, a laptop, a server, or cloud computing infrastructure to perform the operations.

It will be apparent to those skilled in the art that various modifications and variations can be made to the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for protecting a mobile terminal device from cyber security threats, comprising:
   executing, by at least a processor in the mobile terminal device, test routines program codes stored in a non-transitory memory to configure the mobile terminal device to perform testing on at least one electric utility device;
   disabling an internal firewall of the mobile terminal device, disabling communication to one or more network interfaces, and disabling connection to one or more physical interfaces for plug-in device ports, such that all existing communications or connections with the mobile terminal device are terminated and new communications and connections with the mobile terminal device are prevented;
   enabling communication to only one or both of a selected physical interface and a selected network interface from among the one or more network interfaces and the one or more physical interfaces that are disabled;
   performing the testing on the at least one electric utility device via one or both of the selected physical interface and the selected network interface according to the executed test routines under control of the mobile terminal device;
   enabling, in response to completion of the testing, the internal firewall of the mobile terminal device; and
   controlling the internal firewall to only permit a new communication connection to a network interface disabled during the testing in response to receipt of a user permission signal identifying the network interface disabled during the testing as being permitted to communicate.

2. The method according to claim 1, wherein enabling, in response to completion of the testing, the internal firewall of the mobile terminal device comprises detecting the completion of the testing on the at least one electric utility device, switching the mobile terminal device from a test state to a network state by:
   disabling communication to the one or both of the selected physical interface and the selected network interface; and
   enabling the internal firewall of the mobile terminal device, such that new communications or connections are permitted.

3. The method according to claim 2, wherein switching the mobile terminal device from the test state to the network state comprises changing a state mode displayed on the mobile terminal device from the test state to the network state.

4. The method according to claim 1, wherein controlling the internal firewall comprises receiving a user input signal selecting the selected network interface from among the disabled one or more network interfaces to enable new communications; and keeping unselected remaining network interfaces and the one or more physical interfaces for plug-in device ports disabled.

5. The method according to claim 1, wherein enabling, in response to completion of the testing, the internal firewall of the mobile terminal device comprises disabling communication to the only one or both of the selected physical interface and the selected network interface, in response to one or both of completion of the testing and receipt of a user input communication disable signal.

6. The method according to claim 1, wherein enabling communication to only one or both of the selected physical interface and the selected network interface comprises enabling communication in response to receipt of a user input signal selecting only one or both of the selected physical interface and the selected network interface for communication during the testing.

7. The method according to claim 1, wherein the mobile terminal device comprises any one of: a computer, a laptop computer, a tablet computer, a portable handheld device or a dedicated proprietary testing hardware, wherein the at least one electric utility device comprises any one of: a power transformer, a current transformer, a circuit breaker, a recloser, a relay, a transformer bushing, a coupling capacitor and a surge arrester.

8. The method according to claim 1, wherein the selected physical interface comprises a Universal Serial Bus (USB) interface or any suitable hardware interface, and the selected network interface comprises an Ethernet interface or any suitable interface connection that communicates bidirectional signals under a communication protocol.

9. The method according to claim 1, wherein disabling the internal firewall of the mobile terminal device, disabling communication to the one or more network interfaces, and disabling connection to the one or more physical interfaces for plug-in device ports comprises determining device names, port names, and network names prior to the disabling of the one or more network interfaces and the one or more physical interfaces for plug-in device ports; and applying profile rules to deny public and private network connections according to the determined device names, port names, and network names.

10. A mobile terminal device, comprising:
at least a processor included as hardware in the mobile terminal device executing test routines program code stored in a non-transitory memory to configure the mobile terminal device to perform testing on at least one electric utility device;
an internal firewall, the processor executes code to disable the internal firewall of the mobile terminal device to enter a test state;
a communication interface comprising at least one of a network interface or a physical interface, the processor executes code to disable communication to the communication interface to enter the test state, such that all existing communications or connections via the communication interface are terminated and new communications and connections via the communication interface are prevented; and
a user interface, the processor executes code to receive, from the user interface while in the test state a user selection of at least one of a selected test network interface or a selected test physical interface included in the disabled communication interface, and the processor executes code to, responsive to the user selection, enable test communication during the test state to only one or both of the selected test physical interface and the selected test network interface to perform the testing on the at least one electric utility device according to the executed test routines;
wherein the processor, upon completion of the testing, executes code to enable the internal firewall and disable at least one of the selected test network interface or the selected test physical interface to enter a network state; and
wherein the processor, in the network state, executes code to control the internal firewall to only enable communication of a network interface in the disabled communication interface, in response to receipt, via the user interface, during the network state, of a user permission of said network interface for new communication.

11. The mobile terminal device according to claim 10, wherein the processor executes code to deny permission to communicate in the test state by disablement of the internal firewall and the communication interface until detection of the completion of the testing on the at least one electric utility device, and then switch to the network state to enable the processor to secure user permission via the user interface for internal and external network connectivity of only said network interface and otherwise maintain disablement of communication to the communication interface.

12. The mobile terminal device according to claim 10, wherein the processor executes code to update a state mode indicated in the user interface from the test state to the network state while communication to the communication interface remains disabled, or the processor, in response to detection of successful connection of one or both of the selected test physical interface or the selected test network interface between the mobile terminal device and another electric utility device under test, executes code to maintain the test state.

13. The mobile terminal device according to claim 10, wherein the mobile terminal device comprises any one of: a computer, a laptop computer, a tablet computer, a portable handheld device or a dedicated proprietary testing hardware, the at least one electric utility device comprises any one of: a power transformer, a current transformer, a circuit breaker, a recloser, a relay, a transformer bushing, a coupling capacitor and a surge arrester.

14. The mobile terminal device according to claim 10, wherein the existing communications or the new communications to the one or more network interfaces comprises connections to any one of: a local area network (LAN), a wide area network (WAN) or an Internet, a Cellular network, a Broadband network, a Wireless Fidelity (WiFi) network, and a Bluetooth® Network.

15. The mobile terminal device according to claim 10, wherein the processor executes code to determine device names, port names, and network names prior to disabling of the communication interface.

16. The mobile terminal device according to claim 15, wherein the processor executes code to determine device names, port names or network names according to any one of: net class devices containing "Ethernet" in name, ports class devices containing "COM" in name, Bluetooth® net class devices containing "Wireless" in name, USB class devices containing "Broadband" in name, and USB class devices containing "USB Mass Storage Device" in name.

17. A non-transitory computer-readable storage medium comprising instructions that, when executed by a processor protect a mobile terminal device from cyber security threats during testing, the computer-readable storage medium comprising:

instructions executable by the processor to detect that the mobile terminal device is in communication with a device for facilitating testing or to an electric utility device under test;

instructions executable by the processor to switch the mobile terminal device to a test state;

instructions executable by the processor to disable an internal firewall of the mobile terminal device as part of switching to the test state;

instructions executable by the processor, as part of switching to the test state, to disable communication to one or more network interfaces, and disable connection to one or more physical interfaces for plug-in device ports, such that all existing communications or connections are terminated and new communications and connections are prevented;

instructions executable by the processor to perform testing of the electric utility device according to executed test routines;

instructions executable by the processor to enable, in response to completion of the testing, the internal firewall of the mobile terminal device; and instructions executable by the processor to control the internal firewall to only permit a new communication connection to a network interface disabled during the testing in response to receipt of a user permission signal identifying the network interface disabled during the testing as being permitted to communicate.

18. The computer-readable storage medium according to claim 17, further comprising:

instructions executable by the processor in response to detection of completion of the testing of the electric utility device, to switch the mobile terminal device from a test state to a network state, while keeping the one or more network interfaces and the one or more physical interfaces for plug-in device ports disabled; and instructions executable with the processor to change a state mode in a user interface of the mobile terminal device from the test state to the network state.

19. The computer-readable storage medium according to claim 17, wherein the instructions executable with the processor to enable, in response to completion of the testing, the internal firewall of the mobile terminal device comprises instructions executable with the processor to disable communication to the only one or both of the selected physical interface and the selected network interface, in response to one or both of completion of the testing and receipt of a user input communication disable signal.

20. The computer-readable storage medium according to claim 19, wherein the instructions executable with the processor to enable communication to only one or both of the selected physical interface and the selected network interface comprises instructions executable with the processor to enable communication in response to receipt of a user input signal selecting only one or both of the selected physical interface and the selected network interface for communication during the testing.

* * * * *